United States Patent
Sheng-Chang (10) Patent No.: US 7,648,359 B2
(45) Date of Patent: Jan. 19, 2010

(54) MOLD-CONVEYING DEVICE FOR PLASTIC BLOW-MOLDING MACHINE

(75) Inventor: Huang Sheng-Chang, No. 144-1, Shangliao Rd., Taliao Town, Kaohsiung County (TW)

(73) Assignees: Huang Sheng-Chang, Kaohsiung County (TW); Supreme Technic Package Co., Ltd., Tainan (TW)

( * ) Notice: Subject to any disclaimer, the term of this patent is extended or adjusted under 35 U.S.C. 154(b) by 340 days.

(21) Appl. No.: 11/680,473

(22) Filed: Feb. 28, 2007

(65) Prior Publication Data

US 2008/0206387 A1    Aug. 28, 2008

(51) Int. Cl.
*B29C 49/24* (2006.01)
*B29C 49/32* (2006.01)

(52) U.S. Cl. .................. 425/503; 425/522; 425/534; 425/538

(58) Field of Classification Search .......... 425/503, 425/522, 533, 534, 538
See application file for complete search history.

(56) References Cited

U.S. PATENT DOCUMENTS

| | | | | |
|---|---|---|---|---|
| 1,715,896 A | * | 6/1929 | Bullard, Jr. ............. | 29/38 A |
| 3,151,193 A | * | 9/1964 | Thornton ............. | 264/509 |
| 3,496,599 A | * | 2/1970 | Brown ................. | 425/156 |
| 4,303,381 A | * | 12/1981 | Aoki .................... | 425/503 |
| 4,501,548 A | * | 2/1985 | Jahnel .................. | 425/503 |
| 5,026,266 A | * | 6/1991 | Takasaki et al. ....... | 425/150 |
| 6,994,543 B2 | * | 2/2006 | Chang .................. | 425/504 |

* cited by examiner

*Primary Examiner*—Robert B Davis
(74) *Attorney, Agent, or Firm*—J.C. Patents (57) ABSTRACT

A mold-conveying device for an plastic blow-molding machines includes a machine base and an auxiliary mold base. The machine base is located under a main mold base for positioning the lower mold of a shaping mold thereon, provided with plural correcting rods fitted in correcting rod holes in the bottom base of the auxiliary mold base. Further, a power member is provided under the auxiliary mold base for raising or lowering the auxiliary mold base, and the auxiliary mold base is provided with a transmitting device having a transmitting member to match with a rack provided in the machine base for shifting the auxiliary mold base rightward and leftward in accordance with the blow-molding movements of the plastic blow-molding machines for carrying out mold conveying.

3 Claims, 9 Drawing Sheets

MOLD-CONVEYING DEVICE FOR PLASTIC BLOW-MOLDING MACHINE

BACKGROUND OF THE INVENTION

1. Field of the Invention

This invention relates to a mold-conveying device for an plastic blow-molding machines, particularly to one matching with a plastic blow-molding machines for producing plastic products formed integral with labels in a mold, and for this purpose, the shaping mold of the plastic blow-molding machines is divided into a main mold and an auxiliary mold combined together. The mold conveying device positioned at the lower front side of the plastic blow-molding machines is composed of a machine base and an auxiliary mold base. The auxiliary mold base is provided with a transmitting device for driving the auxiliary mold base to move rightward and leftward, having the lower mold of the shaping mold located on the topside. A power member is provided under the auxiliary mold base for raising and lowering the auxiliary mold base to carry out mold conveying in accordance with the blow-molding and molding movements of the injection molding machine.

2. Description of the Prior Art

Figure 1:
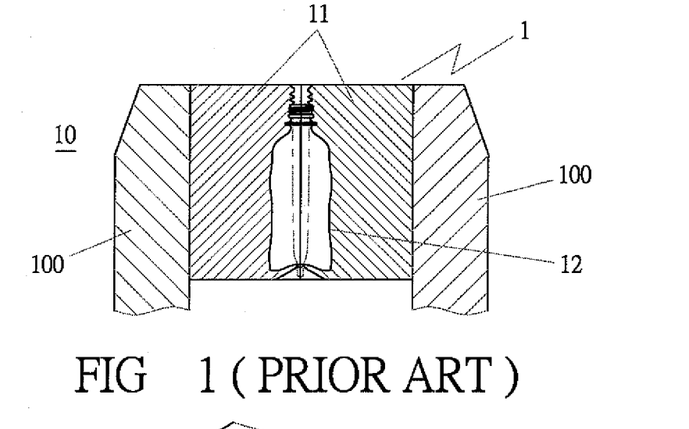
FIG. 1 is a cross-sectional view of the shaping mold of a conventional plastic blow-molding machines.
Figure 2:
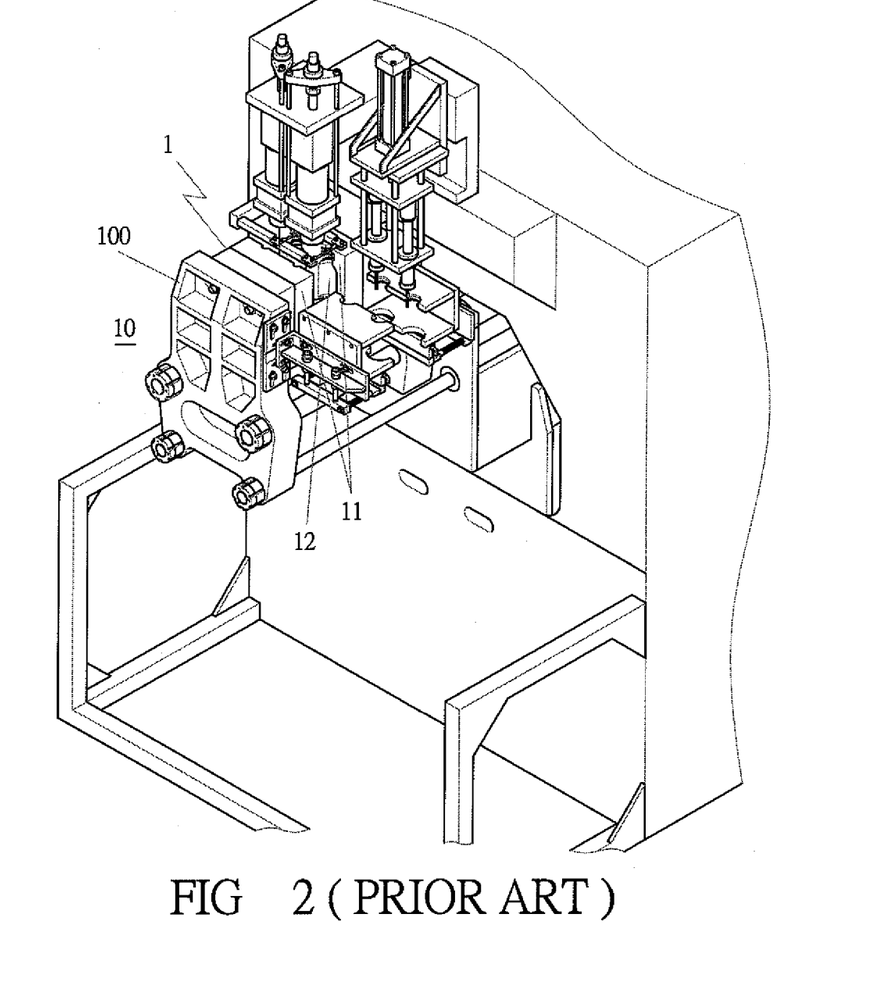
FIG. 2 is a partial perspective view of the conventional plastic blow-molding machines.

A conventional plastic blow-molding machines, as shown in FIG. 2, is provided with a shaping mold 1 at the lower front side. The shaping mold 1 is provided with a mold base 10, which is composed of a left and a right mold wall 100 for respectively fixing a left and a right mold block 11 of the shaping mold 1, as shown in FIG. 1. By so designing, it is difficult to produce a plastic product formed integral with a label in the shaping mold 1 of the conventional plastic blow-molding machines because the label has to be deposited in the shaping mold 1 in advance so that the plastic product can be formed integral with the label in the shaping mold 1. However, referring to in FIG. 1, when the left and the right mold block 11 of the shaping mold 1 are opened, the lower hollowed space will make the label impossible to be kept steady in the cavity 12 of the shaping mold 1 before the left and the right mold block 11 are closed, and hence the label and the plastic product cannot be formed integral in the shaping mold 1, thus bringing about hindrance in employing the conventional plastic blow-molding machines for producing plastic products formed integral with labels in the shaping mold 1.

To solve the above-mentioned problem of the conventional plastic blow-molding machines, the shaping mold of an plastic blow-molding machines in the present invention is provided with an upper and a lower mold block combined together, and the upper mold block is composed of a left and a right small mold block, while the lower mold block is formed integrally. Thus, labels can be kept steady in the cavity of the shaping mold of the plastic blow-molding machines, and by means of the mold-conveying device of the plastic blow-molding machines and by using blow-molding technique, the plastic product formed integral with the label can be produced in the shaping mold.

SUMMARY OF THE INVENTION

The objective of this invention is to offer an blow-molding technique for producing plastic products formed integral with labels in a mold, able to insure the labels to be kept steady in the cavity of a shaping mold after they are deposited therein. Before the plastic products in the shaping mold are shaped, the labels will be properly heated by the high temperature in the shaping mold and completely attached on the surfaces of the plastic products after the plastic products are shaped.

The features of this invention are described as follows.

1. The plastic blow-molding machines of this invention is provided with a mold-conveying device composed of a machine base and an auxiliary mold base. The machine base is fixed under the main mold base of the plastic blow-molding machines, and the auxiliary mold base is provided with a transmitting device for driving the auxiliary mold base to move rightward and leftward.

2. The auxiliary mold base of the mold-conveying device is mounted on the machine base, and the lower mold of the shaping mold is located on the auxiliary mold base. A power member is installed under the auxiliary mold base for driving the auxiliary mold base to move up and down and convey the shaping mold in accordance with the blow-molding movements of the plastic blow-molding machines.

BRIEF DESCRIPTION OF DRAWINGS

This invention will be better understood by referring to the accompanying drawings, wherein.

DETAILED DESCRIPTION OF THE PREFERRED EMBODIMENT

Figure 10:
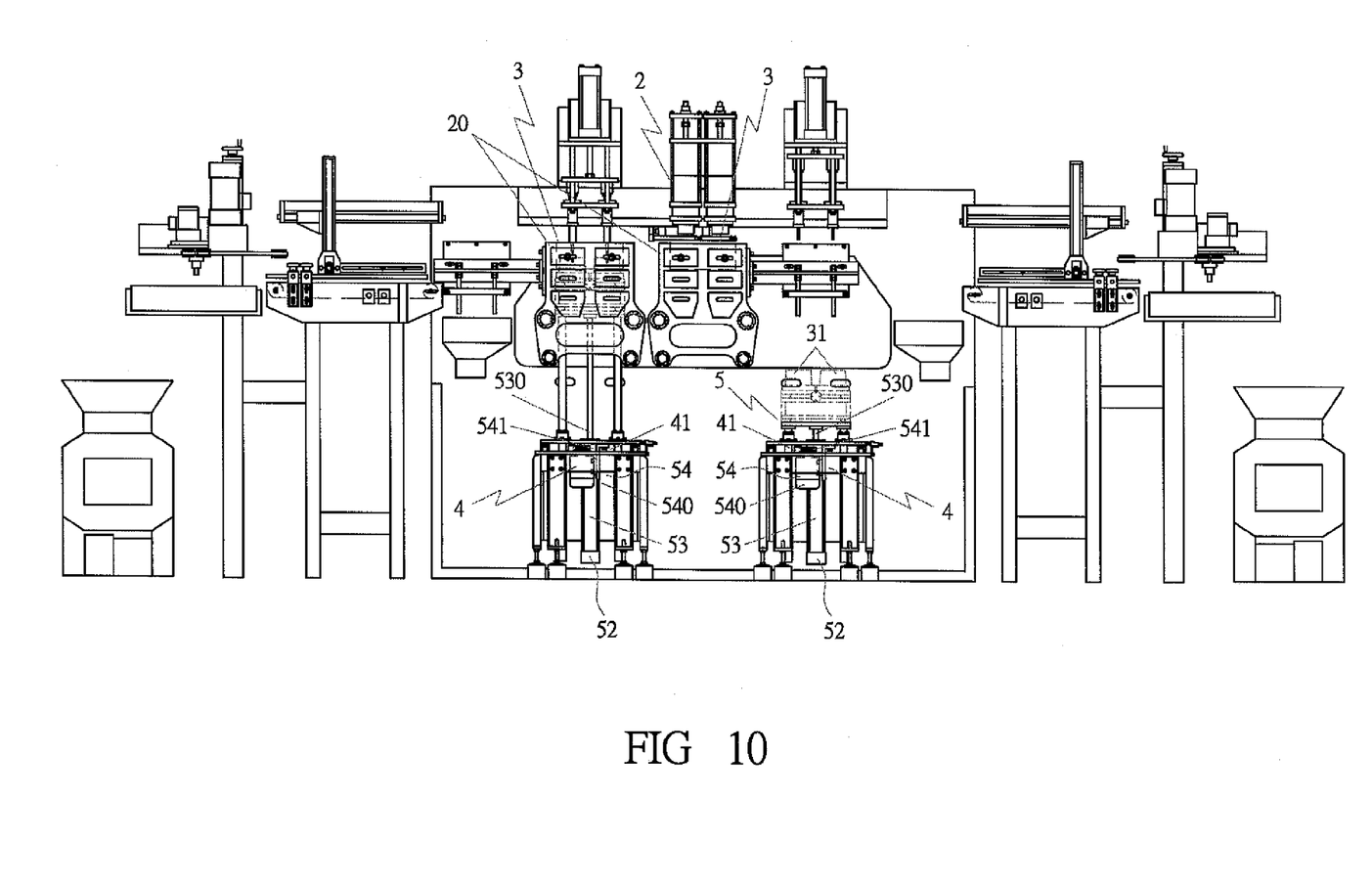
FIG. 10 is a cross-sectional view of the plastic blow-molding machines provided with plural units of mold-conveying devices in the present invention.

A first preferred embodiment of a mold-conveying device for an plastic blow-molding machines in the present invention, as shown in FIGS. 3 to 9, is a single-unit conveying device for matching with a single-unit shaping mold 3. In this invention, two or more units of conveying devices can be provided in accordance with the number of the shaping molds 3 of an plastic blow-molding machines. FIG. 10 shows that two units of conveying devices are disposed at the lower front side of the plastic blow-molding machines to match with two units of shaping molds 3 of the plastic blow-molding machines. Of course, if the plastic blow-molding machines is provided with three or more units of shaping molds 3, the same number of conveying devices can be installed.

The mold conveying device is installed under the front side of the plastic blow-molding machines 2 at a location corresponding with the main mold base 20 of the plastic blow-molding machines 2, which is fixed with the upper mold 30 of the shaping mold 3, as shown in FIGS. 6 to 9. The mold-conveying device of this invention includes a machine base 4 and an auxiliary mold base 5 combined together.

The machine base 4 positioned under the main mold base 20 of the plastic blow-molding machines 2 is provided with a dovetail rail 40 and a rack 41 engaged with the transmitting gear 541 of the auxiliary mold base 5 for driving the auxiliary mold base 5 to move rightward and leftward, as shown in FIGS. 6 to 9.

Figure 3:
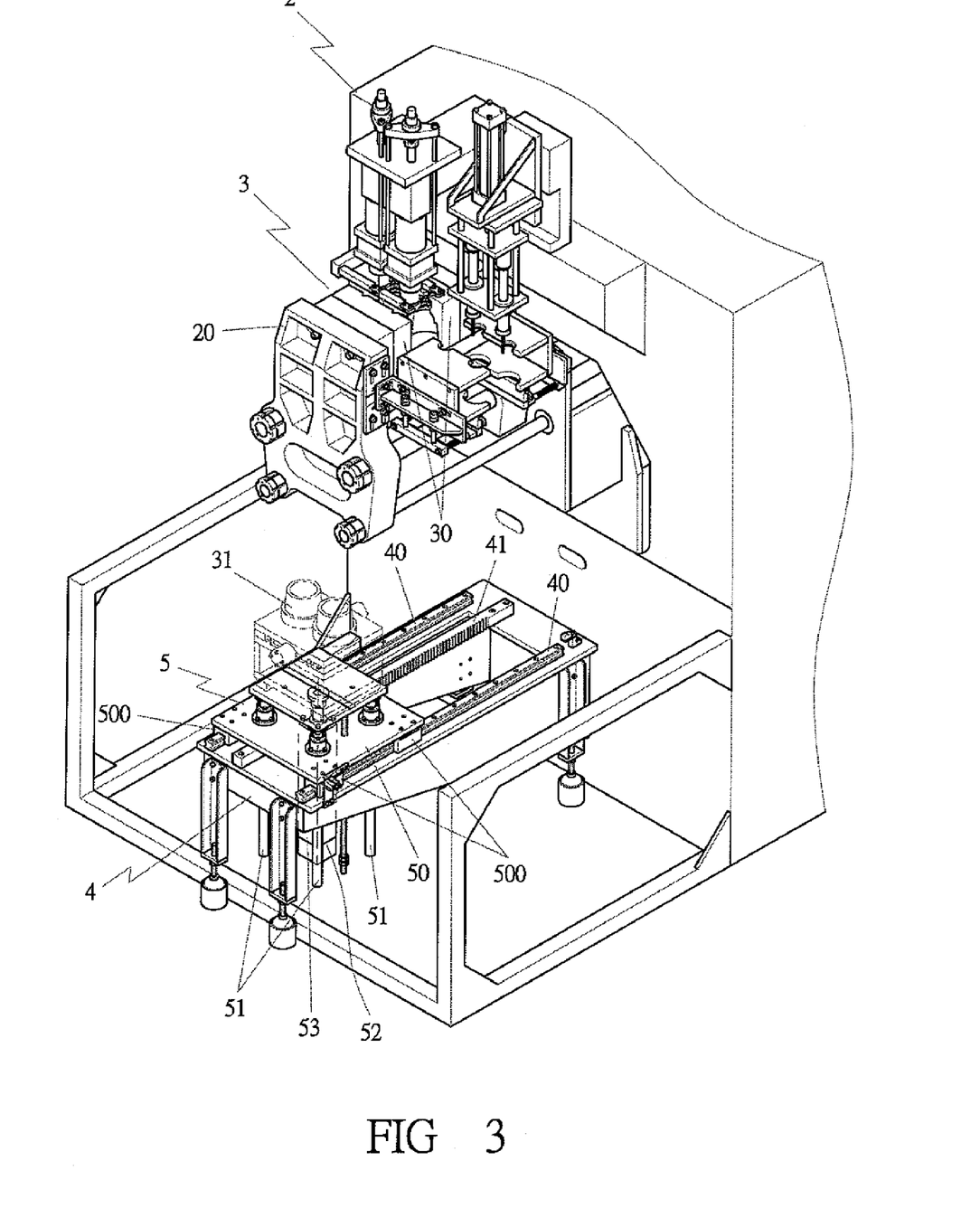
FIG. 3 is a perspective view of an plastic blow-molding machines in the present invention.
Figure 6:
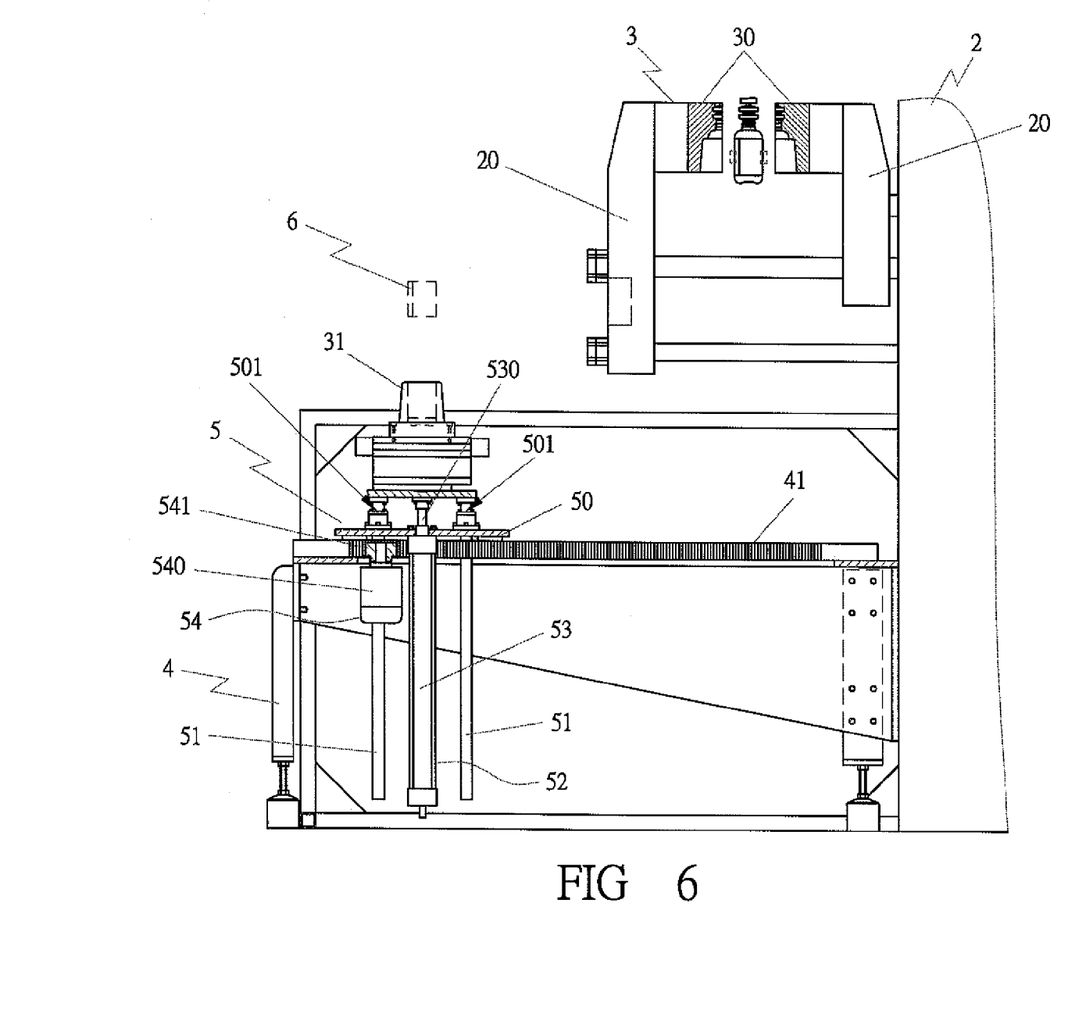
FIG. 6 is a partial cross-sectional view of a mold conveying device in the present invention.
Figure 7:
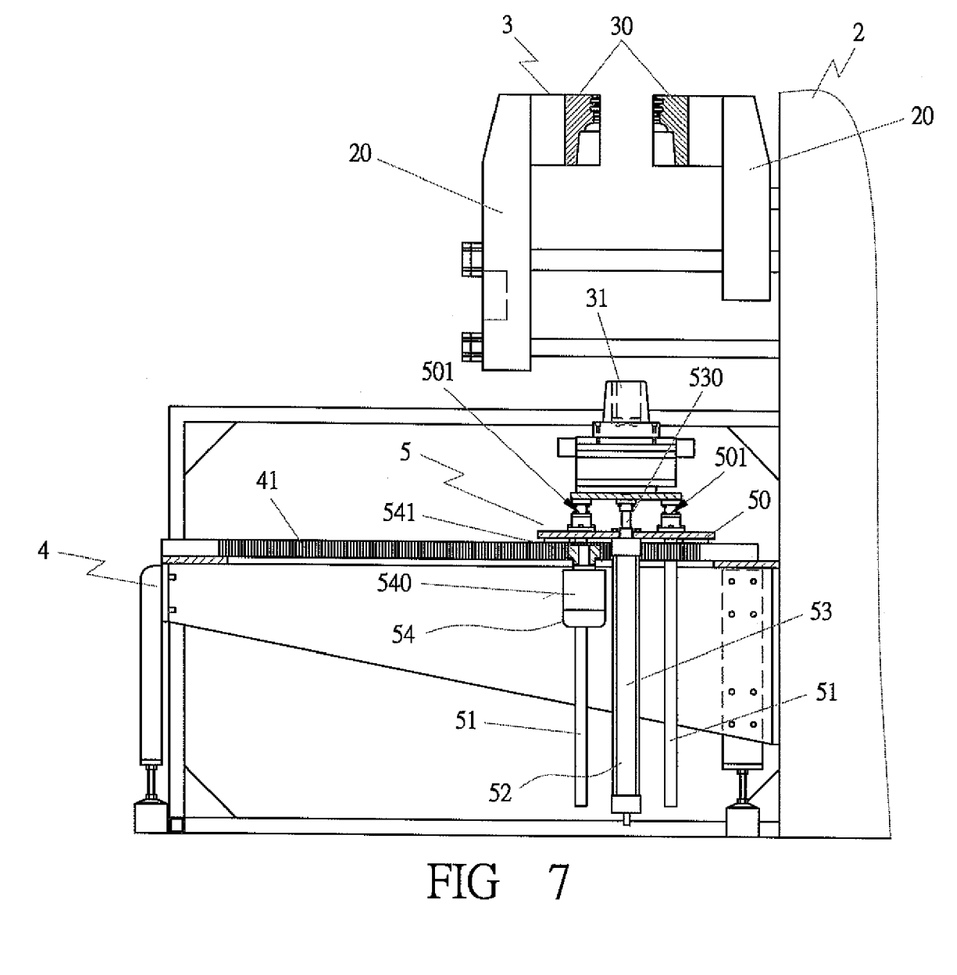
FIG. 7 is a partial cross-sectional view of the lower mold of a shaping mold at a location to be moved up in the present invention.
Figure 8:
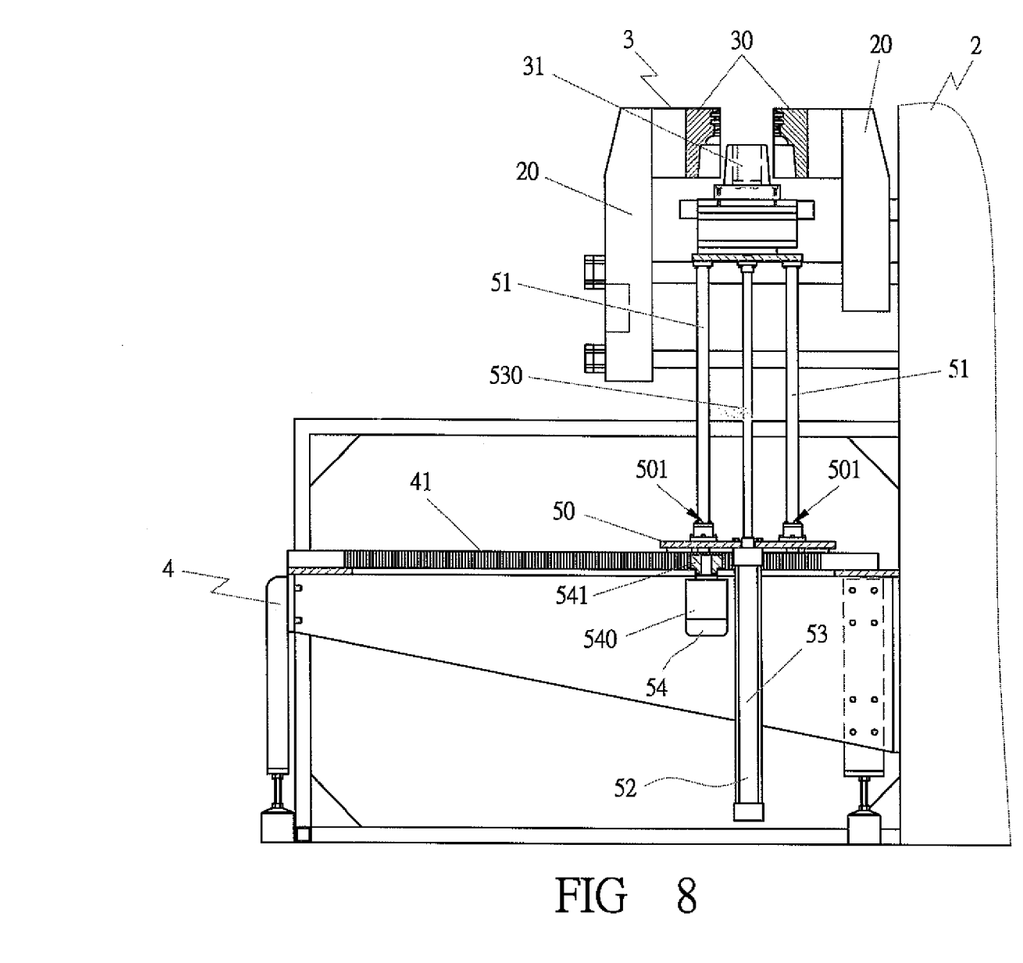
FIG. 8 is a partial cross-sectional view of the lower mold of the shaping mold moved up to the location of the main mold base of the plastic blow-molding machines in the present invention.
Figure 9:
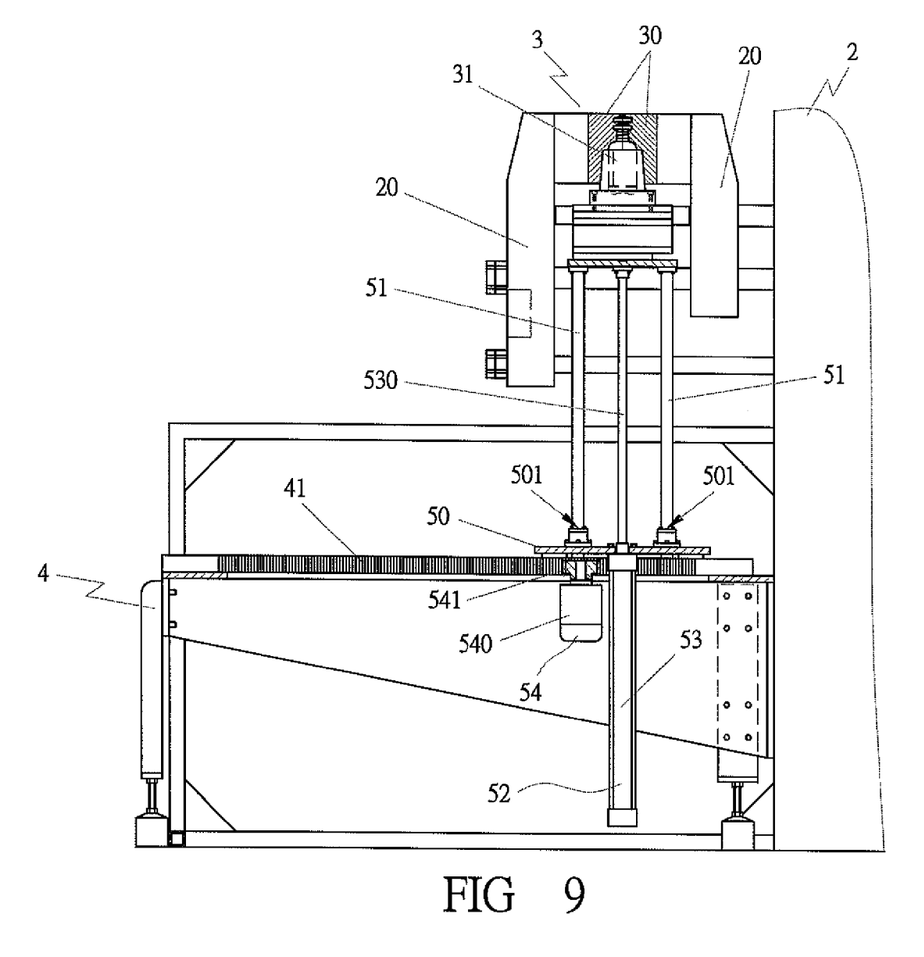
FIG. 9 is a partial cross-sectional view of the lower mold of the shaping mold combined with the main mold of the plastic blow-molding machines.

The auxiliary mold base 5 assembled on the machine base 4 is provided with a bottom base 50 bored with a dovetail rail groove 500 matching with the dovetail rail 40 of the machine base 4 for restricting the auxiliary mold base 5 to move in a definite direction, as shown in FIG. 3, with the lower mold 31 of the shaping mold 3 located on the topside of the auxiliary mold base 5. Further, the auxiliary mold base 5 is disposed with a plurality of correcting rods 51 respectively fitted in the correcting rod holes 501 of the bottom base 50, as shown in FIGS. 6, 7 and 8, and a power member 52 is secured under the bottom base 50 of the auxiliary mold base 5. The power member 52 is preferably a piston cylinder 53 having its piston rod 530 fixed with the underside of the auxiliary mold base 5 for driving the auxiliary mold base 5 to move up and down quickly, as shown in FIGS. 7 and 8.

Figure 4:
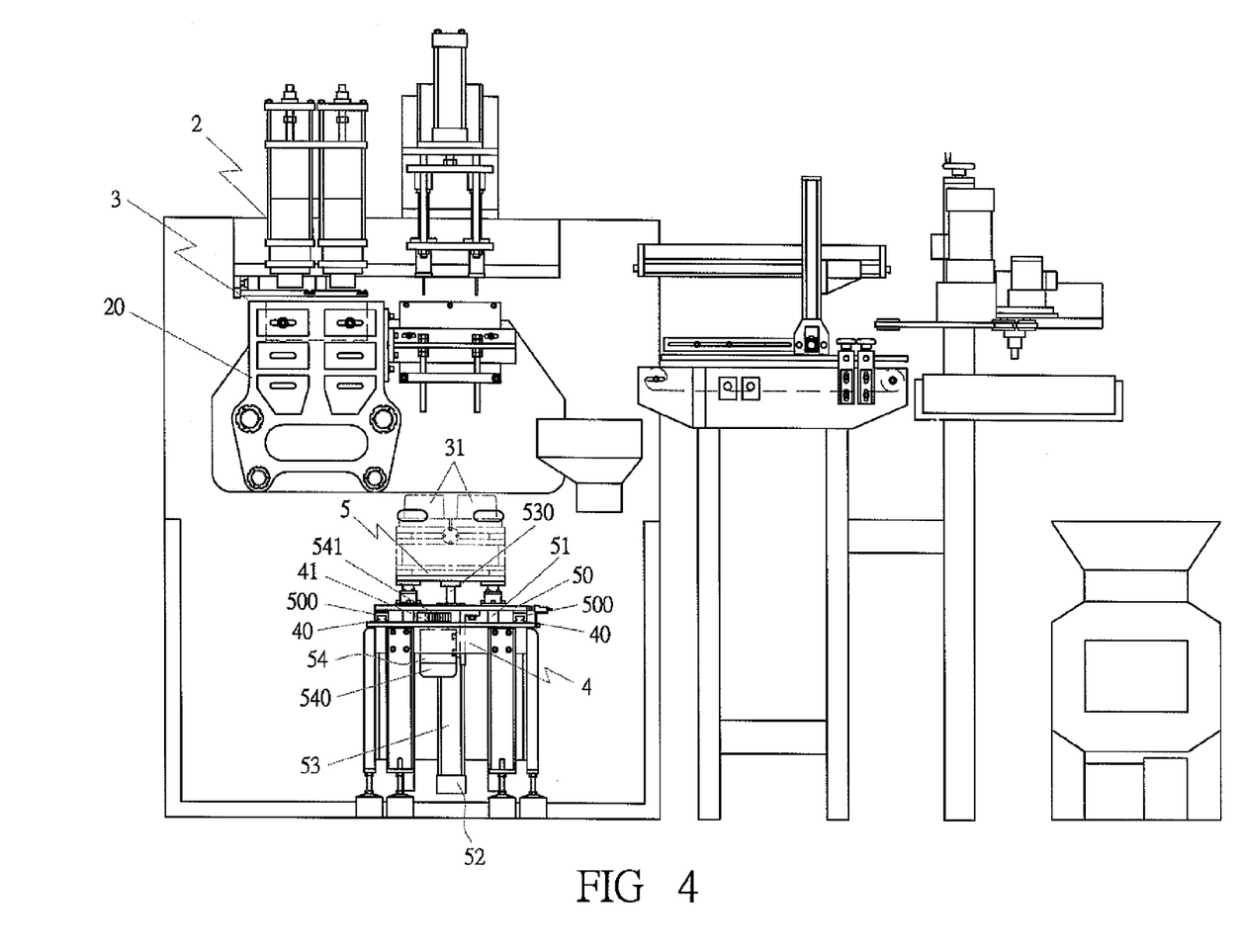
FIG. 4 is a partial front view of the shaping mold of the plastic blow-molding machines in the present invention.
Figure 5:
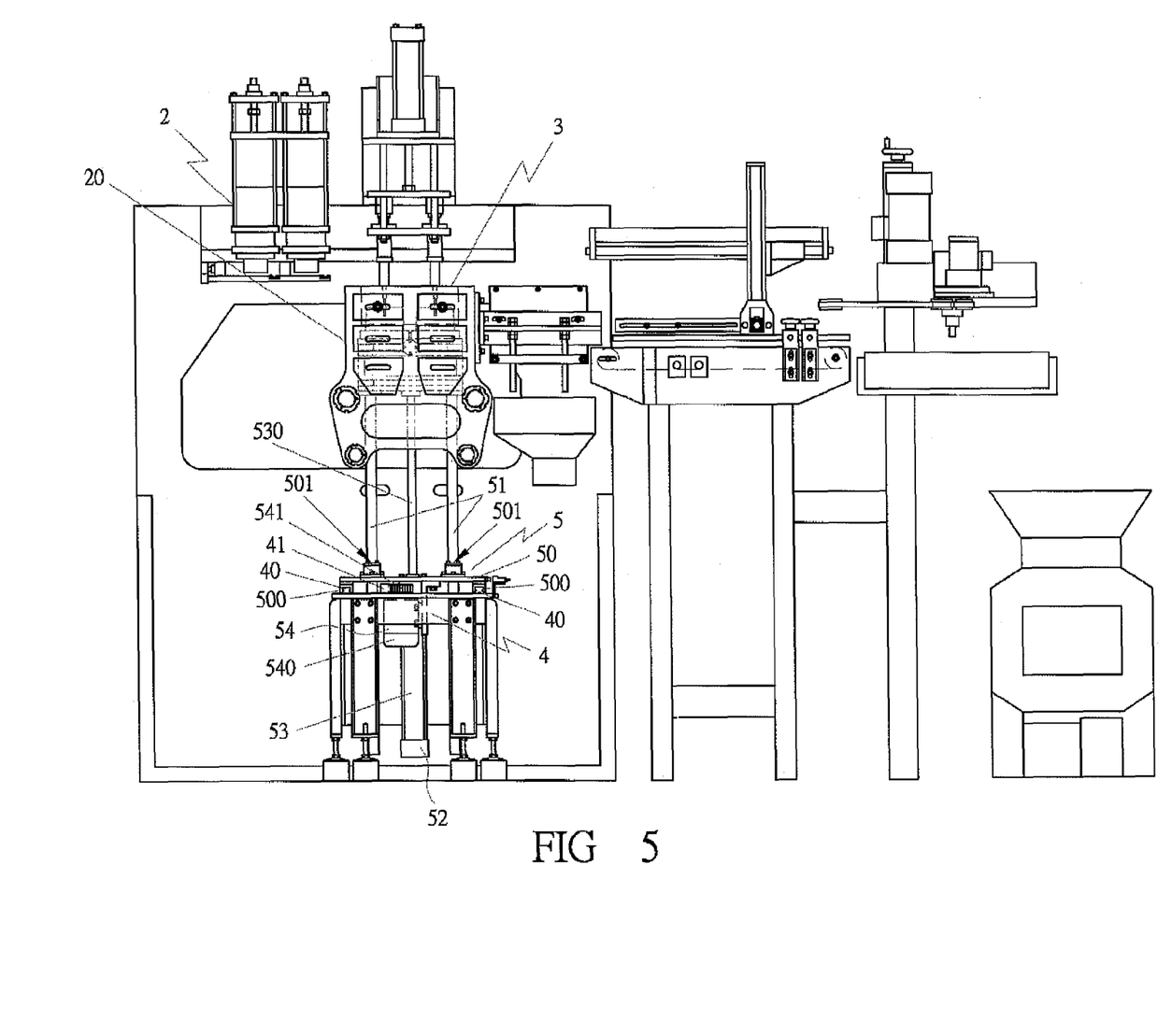
FIG. 5 is a partial front view of the plastic blow-molding machines ready to carry out blow-molding in the present invention.

In addition, a transmitting device 54 is assembled under the auxiliary mold base 5, provided with a transmitting member 540, as shown in FIGS. 4 and 5, The transmitting member 540 could be a motor or a piston cylinder so long as it is able to drive the auxiliary mold base 5 to move rightward and leftward. The transmitting member 540 has its spindle secured thereon with a transmitting gear 541 engaged with the rack 41 of the machine base 4, as shown in FIG. 6. When the transmitting member 540 is started to drive the transmitting gear 541 and the rack 41 to operate, the auxiliary mold base will be driven to move rightward and leftward according to the blow-molding movements of the plastic blow-molding machines for conveying the shaping mold 3.

By so designing, the mold-conveying device provided at the lower front side of the plastic blow-molding machines can quickly convey the shaping mold 3 to a fixed point in accordance with the blow-molding movements of the plastic blow-molding machines. Therefore, the plastic blow-molding machines, making use of an blow-molding technique, can produce plastic products formed integral with labels in a mold. In addition, labels 6 can be conveniently put in the cavity of the shaping mold and kept steady therein, as shown in FIG. 6, and before the plastic product in the plastic blow-molding machines are shaped, the labels will be properly heated by the high temperature in the mold and then completely bonded on the surfaces of the plastic products after the plastic products are shaped.

While the preferred embodiment of the invention has been described above, it will be recognized and understood that various modifications may be made therein and the appended claims are intended to cover all such modifications that may fall within the spirit and scope of the invention.

I claim:

1. A mold-conveying device for a plastic blow-molding machine comprising:

a machine base assembled under a main mold base of a plastic blow-molding machine, said machine base provided with a dovetail rail and a rack, said rack engaged with the transmitting gear of an auxiliary mold base; and said auxiliary mold base mounted on said machine base, said auxiliary mold base provided with a bottom base, said bottom base bored with a dovetail rail groove matching with said dovetail rail of said machine base, a shaping mold located on the topside of said auxiliary mold base, said auxiliary mold base disposed with correcting rods respectively fitted in the correcting rod holes of said bottom base, a power member provided under said bottom base of said auxiliary mold base, said power member adapted to drive said auxiliary mold base to move up and down, said auxiliary mold base further provided with a transmitting device, said transmitting device provided with a transmitting member having its spindle secured thereon with a transmitting gear, said transmitting gear engaged with said rack of said machine base, said transmitting member actuating said transmitting gear to rotate and drive said auxiliary mold base to move rightward and leftward;

wherein said power member is attached to said bottom base of said auxiliary mold base and moves with said auxiliary mold base rightward and leftward.

2. The mold-conveying device for a plastic blow-molding machine as claimed in claim 1, wherein said transmitting member is a motor.

3. The mold-conveying device for a plastic blow-molding machine as claimed in claim 1, wherein the number of said conveying devices of said plastic blow-molding machines is to be changed for tallying with the number of said shaping molds.

* * * * *